E. R. DRAVER.
COMBINED TIRE CARRIER AND COVER.
APPLICATION FILED JAN. 31, 1916.
1,199,970.
Patented Oct. 3, 1916.
2 SHEETS—SHEET 2.
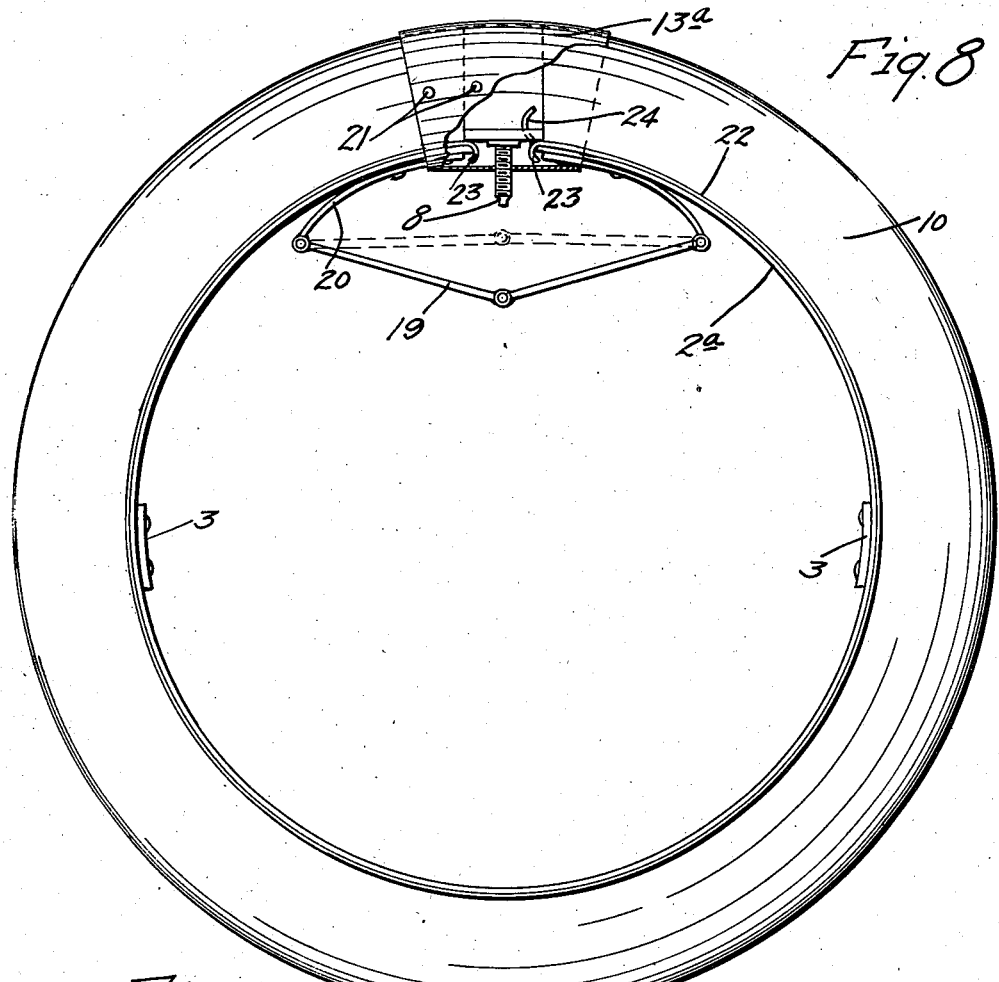
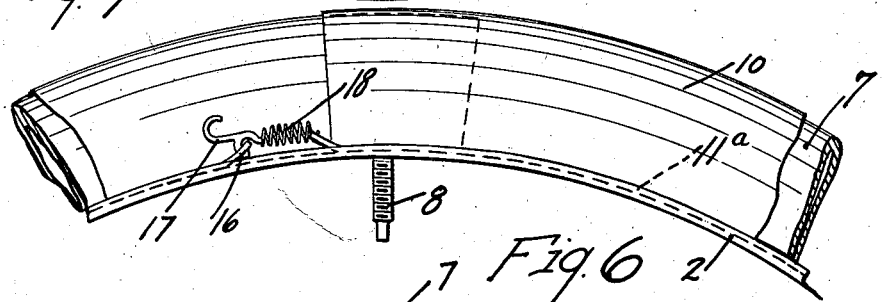
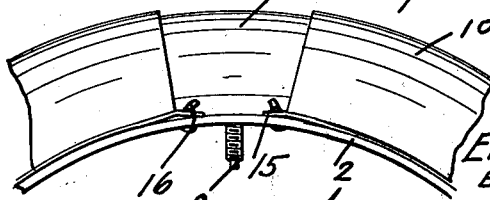
WITNESSES
E. C. Skinkle
A. H. Opsahl
INVENTOR
Emil R. Draver
BY HIS ATTORNEYS

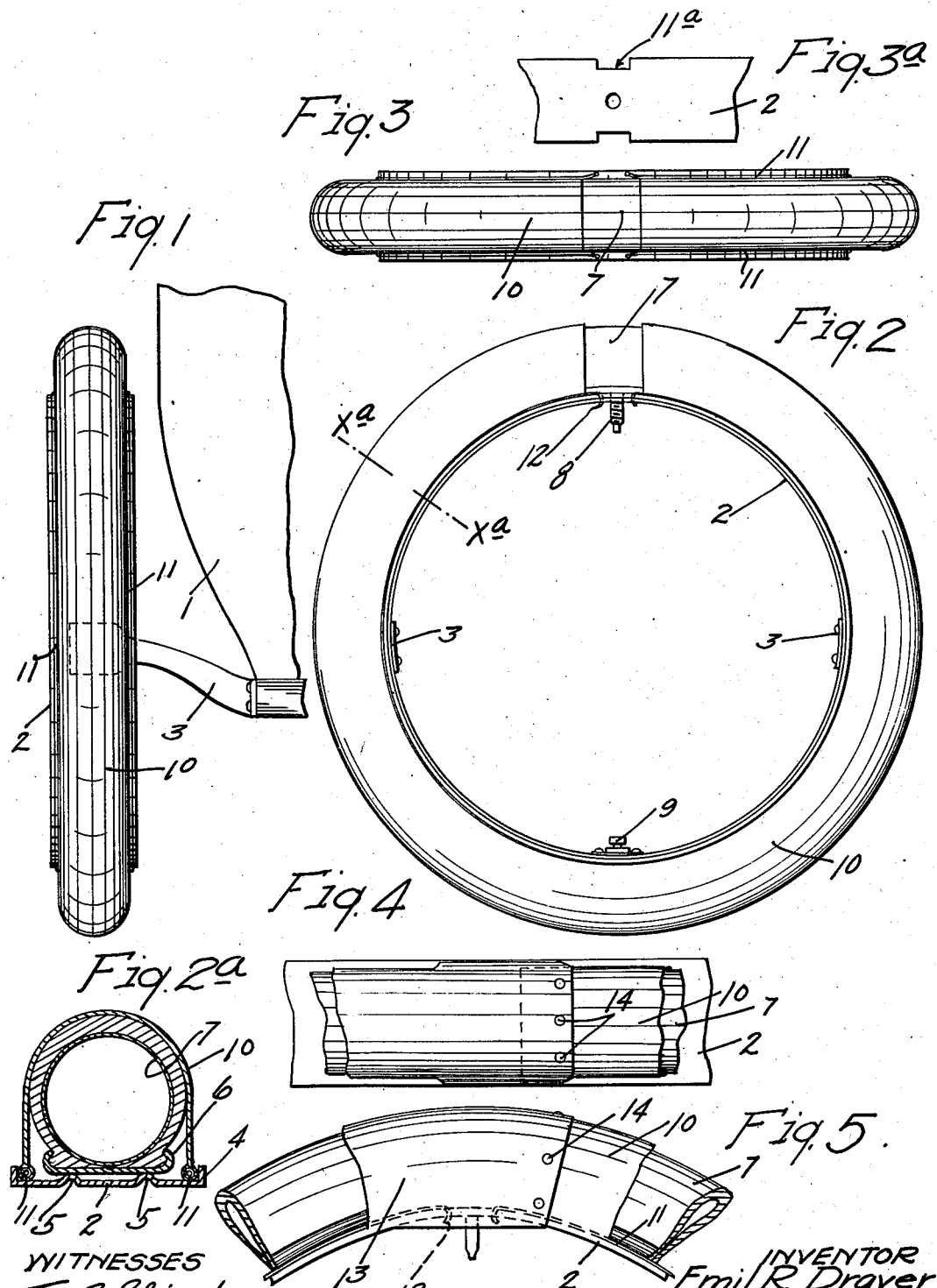

UNITED STATES PATENT OFFICE.

EMIL R. DRAVER, OF RICHMOND, INDIANA.

COMBINED TIRE CARRIER AND COVER.

1,199,970.  Specification of Letters Patent.  Patented Oct. 3, 1916.

Application filed January 31, 1916. Serial No. 75,301.

*To all whom it may concern:*

Be it known that I, EMIL R. DRAVER, a citizen of the United States, residing at Richmond, in the county of Wayne and State of Indiana, have invented certain new and useful Improvements in Combined Tire Carriers and Covers; and I do hereby declare the following to be a full, clear, and exact description of the invention, such as will enable others skilled in the art to which it appertains to make and use the same.

My invention has for its object to provide an improved combined tire carrier and cover, and to such ends, generally stated, it consists of the novel devices and combinations of devices hereinafter described and defined in the claims.

In a sense, the present device is in the nature of an improvement on the combined carrier and cover disclosed and broadly claimed in my co-pending application S. N. 39,145 filed of date, July 10th, 1915. The drawings of said co-pending application illustrate a tire cover that is divided on a circumferentially extended line, but the present application provides a flexible tire cover that is transversely divided at one point, or, in other words, is of annular form, but with ends that either overlap, abut or are closely jointed.

In the accompanying drawings wherein like characters indicate like parts throughout the several views, several forms of the present invention are illustrated.

Referring to the drawings: Figure 1 is a side elevation showing the combined carrier and cover supported from the rear of the body frame of an automobile; Fig. 2 is a side elevation of the combined carrier and cover; Fig. 2$^a$ is a transverse section taken on the line $x^a$ $x^a$ of Fig. 2, showing the parts on a larger scale; Fig. 3 is a plan view of the parts shown in Fig. 2; Fig. 3$^a$ is a plan view showing a fragment of the upper portion of the so-called carrying hoop; Fig. 4 is a plan view showing fragments of the upper portions of the combined carrier and cover and tire; Fig. 5 is a side elevation of the parts shown in Fig. 4; Fig. 6 is a fragmentary view in side elevation showing the upper portions of a tire carrying hoop and cover; Fig. 7 is a view corresponding to Fig. 6 but illustrating a still further modification; and Fig. 8 is a side elevation showing a still further modified form of carrying hoop and tire cover.

Referring first to the construction illustrated in Figs. 1 to 5, inclusive, the numeral 1 indicates the rear portion of the body frame of an automobile, to which a stiff pressed metal carrying hoop 2 is rigidly secured by means of brackets 3. This carrying hoop 2, at its edges, has small outturned flanges 4 and is provided with outwardly pressed bosses 5.

The extra demountable rim 6 is adapted to be telescoped over the flanges 4 and onto the bosses 5, while the tire 7 is attached thereto. At its top, the carrying hoop 2 has a suitably formed passage through which the charging nipple 8 of the tire 7 is adapted to be freely passed. This charging nipple is preferably engaged with the carrying hoop at its top, so that it positively holds the upper portion of the demountable rim from slipping off from the carrying hoop and causes the lower portion of the said rim to hang by gravity under the lower portion of the carrying hoop. Of course, when desired, auxiliary means, such as a set screw 9 applied to the lower portion of the carrying hoop, may be provided for engagement with the lower portion of the demountable rim to more positively hold the same against lateral displacement.

The tire cover 10 is of a flexible or pliable material, such, for example, as water-proofed cloth or fabric. Hems are formed in the edges of the cover and therein are placed flexible clamping bands 11. These clamping bands may take different forms, but in the preferred arrangement, are long and small coiled springs which have endwise elasticity, and the ends of which project beyond the ends of the cover and terminate in hooks 12 adapted to be inserted through perforations in the upper marginal portions of the carrying hoop 2, as shown in Fig. 3, or to be engaged with notches 11$^a$ formed in the edges of the said hoop, as shown in Fig. 3$^a$. In applying the cover around the tire and demountable rim, the hooks 12, at one end of the cover are first applied in the perforations or notches of the carrying hoop and then the cover is pulled or stretched around the tire and the hooks at the other end thereof are applied to the said perforations or notches. When the flanges 4 are provided, they very securely hold the flexible elastic edge portions of the cover against lateral displacement. The elasticity in the clamping bands 11 forms very close and tight joints between the tire cover and carrying hoop.

To close the joint between the ends of the tire cover, the said cover, at one end, is preferably provided with a permanently attached extension flap 13, adapted to overlap the other end of the cover and to be attached thereto, by fasteners, such as snap buttons 14. This extension flap 13, at its edges, would preferably be extended down, so that it will overlap the sides of the upper portion of the carrying hoop, as best shown in Fig. 5, and thereby prevent rain or snow and dust from getting into the interior of the tire cover.

The construction in Fig. 6 may be assumed to be like that illustrated above, except that the clamping bands 11, at their ends, are provided with eyelets or loops 15 adapted to be engaged with anchoring hooks 16 on the carrying hoop.

In the construction illustrated in Fig. 7, the ends of the tire cover 10 are arranged to overlap and instead of employing coiled spring clamping bands, clamping bands in the form of wire cables 11$^a$ are provided. The cables project at their ends, and at one end, are provided with eyes 16, and at their other ends, with hooks 17 attached thereto by short coiled springs 18. The springs 18 in this case give the clamping hoops circumferential elasticity.

The combined tire carrier and cover shown in Fig. 8 is adapted to carry pneumatic tires such as used on Ford machines, that are not mounted on demountable rims, and in this construction, the carrying hoop 2$^a$ is split at the top, and being made of metal, the ends thereof will tend to spring a little closer together than shown in Fig. 8. To separate the ends thereof, a toggle 19 is attached to the arms 20, which, in turn, are riveted, or otherwise secured to the ends of the said carrying hoop. When the toggle is straightened, as shown by dotted lines in Fig. 8, the ends of the hoop will be separated slightly farther than shown by full lines in Fig. 8. In this arrangement, the tire will be placed in direct engagement with the carrying hoop 2$^a$ and its charging nipple 8 will depend between the ends of the said hoop. The toggle 19 constitutes one means for anchoring the cables of the tire cover to the carrying hoop.

The tire cover 10 may be substantially like that illustrated in Figs. 1 to 5, inclusive, but the gap between the ends thereof, in this instance, is closed and covered by a flexible supplemental tubular cover section 13$^a$ that is split longitudinally at one side and provided with snap buttons 21, by means of which its edges may be connected when the said supplemental cover is applied around the ends of the cover 10 and around the adjacent ends of the carrying hoop 2$^a$. In its inner portion, the supplemental cover 13 should have a perforation through which the tire nipple 8 may project. The clamping bands employed with this form of cover may be cables or they may be flexible wires or light spring rods 22, which, at their ends, have hooks 23 adapted to be hooked over the ends of the carrying hoop 2$^a$. The hooks 23, at one end, are preferably provided with finger pieces or clips 24, by means of which they may be more readily engaged with the adjacent end of the said carrying hoop.

The flexible annular tire cover may be correctly described as channel-shaped in cross section, because that is the form that it will take when applied over a tire. The statement made that the "tire cover at its abutting ends is provided with means or anchoring devices for anchoring it to a tire carrying hoop, or the like" is used in a sense broad enough to cover such devices, regardless of whether arranged to directly interlock with each other, or to be directly interlocked to the tire carrying hoop. The gist of the invention is the arrangement whereby the transversely split tire cover may be anchored at one end and then drawn around the tire carrying hoop, or the like, and the other end anchored in respect to the hoop, or in respect to the abutting end of the cover, or both.

What I claim is:

1. A flexible annular channel-shaped transversely split tire cover provided with means for connecting its ends and having a hoop engaging anchor for detachably anchoring the same against circumferential movements onto a carrying hoop.

2. The combination with an anchored carrying hoop, of a flexible annular transversely split detachable tire cover provided with means for connecting its ends, said cover and carrying hoop having detachably engaging devices anchoring said cover against circumferential movements on said hoop.

3. The combination with a carrying hoop and a tire cover, the latter surrounding the former, one of said parts being circumferentially expansible and contractible, and the said hoop and cover having coöperating anchoring devices operative by circumferential adjustment of the expansible member.

4. The combination with an anchored carrying hoop, of a tire cover surrounding said hoop, one of the said parts being circumferentially expansible and contractible, and the said hoop and cover having engaging devices anchoring said cover to the said hoop and against circumferential movements thereon.

5. The combination with a carrying hoop and a tire adapted to be telescoped over the same, of a flexible tire cover transversely split to form abutting ends, and adapted to be placed over said tire and anchored against said hoop, said cover, at its marginal edges, having flexible clamping bands with projecting ends, and means for connecting the projecting ends of said clamping bands to secure said cover to said carrying hoop.

6. The combination with a carrying hoop and a tire adapted to be telescoped over the same, of a flexible tire cover transversely split to form abutting ends, and adapted to be placed over said tire and anchored against said hoop, said cover, at its marginal edges, having flexible clamping bands with projecting ends, and means for connecting the projecting ends of said clamping bands to secure said cover to said carrying hoop, said carrying hoop having marginal out-standing flanges outward of the marginal edges of said cover.

7. The combination with a carrying hoop and a tire adapted to be telescoped over the same, of a flexible tire cover transversely split to form abutting ends and adapted to be anchored on said carrying hoop and over said tire, the said cover having marginal clamping bands and projecting ends, and means for anchoring the projecting ends of said clamping bands to said carrying hoop.

8. The combination with a carrying hoop and a tire adapted to be telescoped over the same, of a flexible tire cover transversely split to form abutting ends and adapted to be anchored on said carrying hoop and over said tire, the said cover having marginal clamping bands and projecting ends and means for anchoring the projecting ends of said clamping bands to said carrying hoop, and the said clamping bands having elastic portions for drawing the marginal edges of said cover against said carrying hoop.

In testimony whereof I affix my signature in presence of two witnesses.

EMIL R. DRAVER.

Witnesses:
 ORRIN DRAVER,
 HENRY C. DRAVER.